Jan. 20, 1942.  F. J. MILLER ET AL  2,270,784
CONDITIONING APPARATUS FOR STEAM HEATING SYSTEMS
Filed May 15, 1940  2 Sheets-Sheet 1

Inventors
F. J. Miller and
F. Sperling
By
Attorneys

Jan. 20, 1942.　　F. J. MILLER ET AL　　2,270,784
CONDITIONING APPARATUS FOR STEAM HEATING SYSTEMS
Filed May 15, 1940　　2 Sheets-Sheet 2
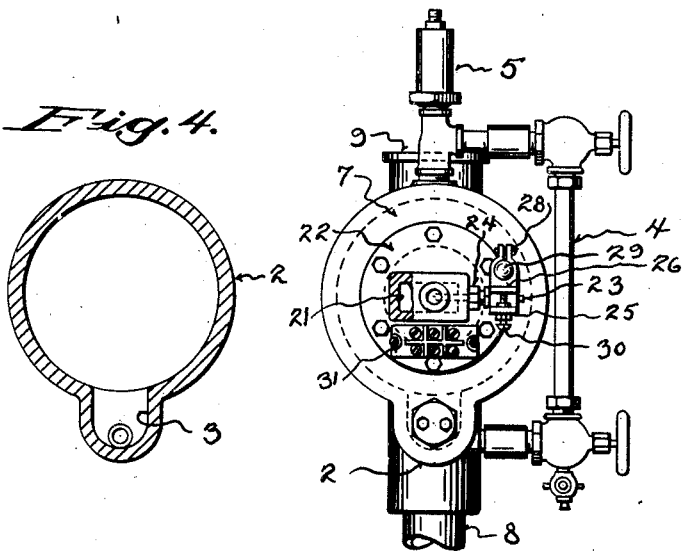
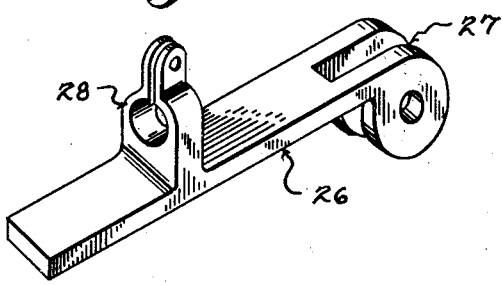
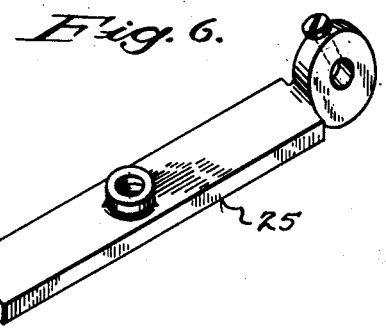
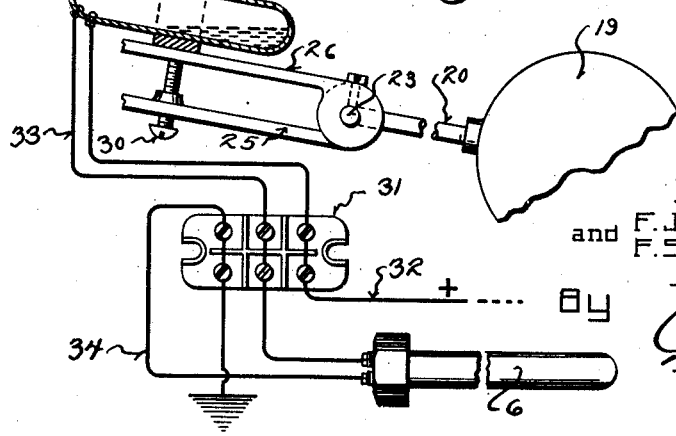
Inventors
F. J. Miller
and F. Sperling
By
Attorneys Patented Jan. 20, 1942

2,270,784

UNITED STATES PATENT OFFICE 2,270,784

CONDITIONING APPARATUS FOR STEAM HEATING SYSTEMS

Frank J. Miller, South Milwaukee, and Fred Sperling, Milwaukee, Wis.

Application May 15, 1940, Serial No. 335,248

4 Claims. (Cl. 219—39)

This invention pertains to apparatus for treating steam heating systems, and more particularly to a unit for introducing chemical correctives into all parts of a steam heating system for removal of scale, rust, and deposits.

The invention has primarily for its object to simplify and increase efficiency of apparatuses of the foregoing character.

Incidental to the foregoing, a more specific object of the invention resides in the provision of an apparatus in which the temperature of the chemical may be quickly raised initially by steam from the heating system, and thereafter maintained at substantially constant temperature and desired pressure by an electric heating element, automatically controlled to prevent its burning out in the absence of chemical.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 3 is an end view, with the dust hood removed;

Figure 4 is a transverse section, taken on the line 4—4 of Figure 1;

Figure 5 is a perspective view of the electrical switch bracket;

Figure 6 is a similar view of the float arm; and

Figure 7 is a diagrammatic showing of the electrical elements and wiring.

Figure 1:
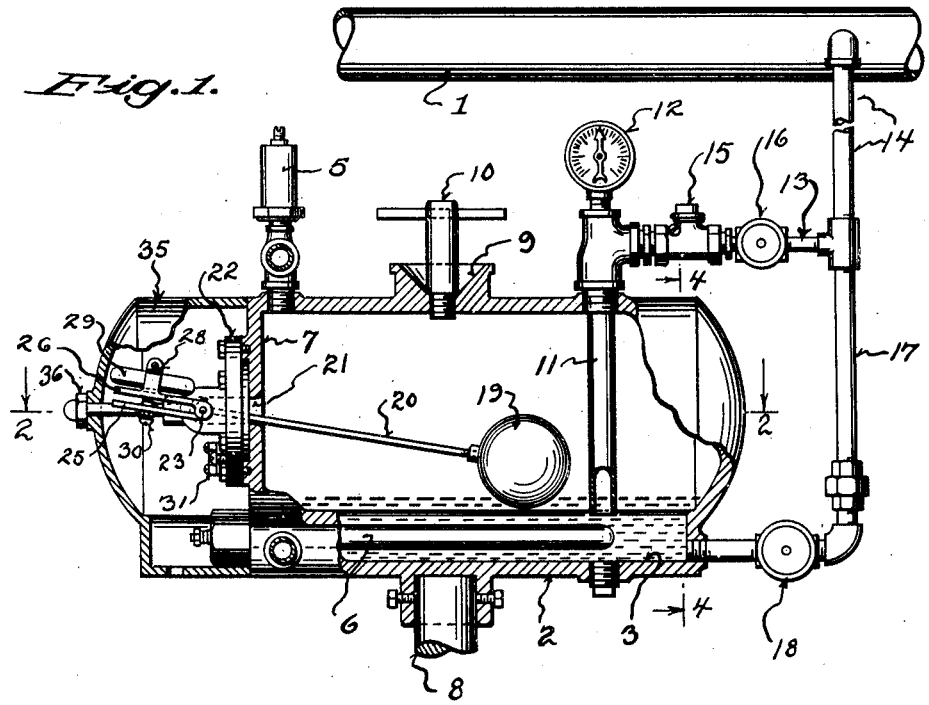
Figure 1 illustrates a preferred form of the present invention, with parts broken away and in section to more clearly illustrate structural features.
Figure 2:
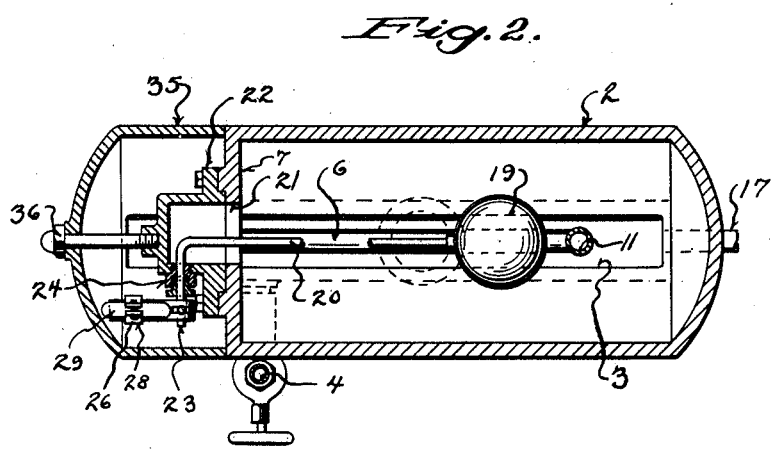
Figure 2 is a longitudinal section, taken on the line 2—2 of Figure 1.

Referring now more particularly to the accompanying drawings, the numeral 1 designates a main feed line in a steam heating system, into which the present invention is designed to atomize chemical correctives by means of pressure developed in the chemical container through the introduction of live steam into the container from the system, and subsequently heating the chemical by an electrical element, or merely the latter.

The present unit essentially comprises a cylindrical tank or chemical container 2, provided in its bottom with a longitudinal well or sump 3. Connected into the sump and top of the container is a conventional sight glass 4, provided with a safety relief valve 5.

An electrical heating element 6 of any conventional type, mounted in the head 7 of the container 2, extends longitudinally in the sump 3. The container 2, which is preferably supported upon a pedestal 8, is provided with a top filling opening 9, normally closed by a threaded plug 10.

Threaded into the tank 2, and extending downwardly into the well 3, is a discharge tube 11 equipped with a pressure gauge 12, and connected through a line 13 with the main steam line 1 by a line 14. The line 13 is provided with a check valve 15 and a regulating needle valve 16.

Connected with the line 14 is a steam supply line 17, which communicates with the tank 2, preferably in the well or lower portion, whereby steam introduced to the tank through the line 17 will permeate and quickly heat chemicals contained within the tank. A globe valve 18, provided in the line 17, controls the introduction of steam to the tank.

Positioned within the tank 2 is a ball float 19, carried by a rod 20 extending through an opening 21 formed in the head 7. The opening 21 is closed by a cap 22, while the rod 20, extending into the cap, terminates in a lateral finger 23, loosely journaled in a packing gland 24 carried by the cap.

Secured on the outer end of the finger 23 is an arm 25, upon which a bracket 26 is superimposed, the bracket having a bifurcated end 27 that straddles the end of an arm 25, and is loosely journaled on the finger 23.

The arm 26 is provided with a split boss 28 for reception of a mercury bulb circuit closer 29. A set screw 30 threaded in the arm 25 serves to adjust the relative position of the arm and bracket 26, thus regulating the angle of the mercury bulb for breaking and closing the element circuit at predetermined positions of the ball float 19. A terminal plate 31, secured to the outer face of the cap 22, receives the wiring circuits.

A dust hood 35, secured to the cap 22 by a thread stud 36, serves to house the mercury switch mechanism.

As best shown in the diagram, Figure 7, a positive line 32 is connected with the mercury bulb 29 through the terminal plate 31. A return line 33 from the bulb 29 connects with one terminal of the element 6, while the line 34 connects the other terminal with the ground.

In operation, any suitable liquid chemical corrective is supplied to the container 2 through the filling opening 9, the level of the chemical being initially spaced slightly below the top of the container to provide a pressure compartment. For pre-heating, the valve 16 is closed, and the valve 18 opened to admit live steam from the main feed line 1 through the lines 14 and 17 to the container 2. When the chemical in the container becomes sufficiently heated by live steam from the system to create the desired pressure within the container, the valve 18 is closed, and the valve 13 opened. Naturally, initial heating is augmented by the element 6 placed in operative condition by raising of the ball float 19 upon filling the container.

Pressure thus generated within the container forces the liquid chemical upwardly through the discharge tube 11 and through the check valve 15, past the needle regulating valve 16, and through the lines 13 and 14. Inasmuch as predetermined pressure maintained within the tank 2 is greater than that within the main steam line 1, as the heated chemical is forced through the restricted needle valve, atomization through expansion of the chemical under reduced pressure causes the same to be quickly carried to all parts of the system.

It may be explained that in some compounds employed for the present purpose there is a tendency for certain ingredients to vaporize and atomize more rapidly than others. Therefore, a particular advantage is obtained in having the discharge tube 11 communicate with the sump 3 or bottom of the container 2, rather than with the top of the container. By this arrangement the liquid is discharged from the bottom, and all of the ingredients are discharged simultaneously and in the same respective proportions as originally compounded.

As the chemical in the tank becomes lowered to the approximate level shown in Figure 1, the float 19 causes the mercury bulb 29 to be tilted to break the element circuit, thus insuring submersion of the element during operation to prevent the same from burning out.

From the foregoing explanation, considered in connection with the accompanying drawings, it will be seen that an exceedingly simple, compact and efficient unit has been provided for effectively atomizing liquid chemical correctives into a steam heating system, whereby scale, rust, and deposits are removed, even from remote pipes, radiators, traps and return lines, thus insuring a clean system, and, consequently, maximum heating efficiency.

We claim:

1. In a steam heating system, the combination with a steam line, of means for supplying a chemical to the steam line including a chemical container having a chemical therein, a communication between said container and the steam line, an electrical heating element positioned in said container, a float for controlling operations of said element, and a second connection between said steam line and container for preheating the chemical for introducing steam into said container.

2. In a steam heating system, a combination with a steam line, of a device for supplying a chemical to said line including a chemical container having a chemical therein, a discharge communication between the bottom of said container and the steam line, an electrical heating element positioned in said container, and a float for controlling operation of said element.

3. In a steam heating system, the combination with a steam line, of a device for supplying a chemical to said line including a chemical container having a chemical therein, a discharge communication between the bottom of said container and the steam line, an electrical heating element positioned within said container, a float for controlling operation of said element, and a second communication between said steam line and said container for introducing steam into said container.

4. In a steam heating system, the combination with a main steam line, of a device for supplying a chemical to said line including a chemical container provided with a sump, a discharge communication between said sump and the main steam line, an electrical heating element positioned in said sump, a float for controlling operation of said element, and a second communication between said steam line and said container for introducing steam into said container.

FRANK J. MILLER.
FRED SPERLING.